United States Patent [19]

Burgess et al.

[11] Patent Number: 4,676,633
[45] Date of Patent: Jun. 30, 1987

[54] PROGRESSIVE DIRECTIONAL EVACUATION OF VACUUM COPY FRAMES

[75] Inventors: Dennis A. Burgess, Tonka Bay; William J. Campbell, Minnetonka; Arvids Saldenais, Champlin, all of Minn.

[73] Assignee: Burgess Industries Inc., Plymouth, Minn.

[21] Appl. No.: 871,313

[22] Filed: Jun. 6, 1986

[51] Int. Cl.$^4$ ............................................. G03B 27/20
[52] U.S. Cl. ......................................... 355/91; 355/73
[58] Field of Search ...................... 355/91, 93, 94, 73, 355/76; 248/363

[56] References Cited

U.S. PATENT DOCUMENTS

| | | | |
|---|---|---|---|
| 2,739,516 | 3/1956 | Hosterman | 355/94 |
| 2,774,289 | 12/1956 | Collins | 355/91 |
| 2,929,309 | 3/1960 | Young | 355/91 |
| 3,625,611 | 12/1971 | Orr et al. | 355/91 X |
| 3,995,955 | 12/1976 | Töpfer | 355/91 |
| 4,080,068 | 3/1978 | Madigan et al. | 355/73 |
| 4,551,016 | 11/1985 | Maher et al. | 355/91 |

Primary Examiner—Richard A. Wintercorn
Attorney, Agent, or Firm—James V. Harmon

[57] ABSTRACT

The present invention provides an improved vacuum frame having upper and lower frame members of rectangular shape, the upper one of which supports a plate of glass. Connected to the lower frame is a flexible sheet such as a rubber sheet with a backing member connected to its lower surfae. Resilient members such as springs urge one edge of the sealing sheet upwardly toward the glass plate and the other edge downwardly away from the glass plate to produce a wedge shaped vacuum chamber which upon being evacuated becomes progressively smaller as air is progressively and directionally removed proceeding from one edge of the glass plate to the other.

12 Claims, 10 Drawing Figures

PROGRESSIVE DIRECTIONAL EVACUATION OF VACUUM COPY FRAMES

FIELD OF THE INVENTION

The invention relates to copy systems and processes and more particularly to vacuum frames that are used for holding superimposed sheets in close contact during exposure.

BACKGROUND OF THE INVENTION

Vacuum frames employed for supporting a superimposed original and copy sheet have long been used for maintaining the sheets in close contact during exposure to light in order to achieve the best possible contact copy. Vacuum frames of this kind consist of a base that supports a backing or blanket upon which the copies are placed and an upper frame member including a glass plate to permit exposure of the sheets to light. While vacuum frames of this kind have been widely used, as air is removed, the backing or blanket tends to rise toward the glass in an unpredictable pattern. This causes air pockets to become trapped between the sheets or between the glass and the superimposed sheets. Several minutes may be required before these trapped air pockets or air bubbles finally work their way out of the system so that the exposure can be made. Moreover, it has been common for exposures to be wasted due to the presence of trapped air pockets. Because both setup time and materials are costly, previous vacuum frame systems have been wasteful and unnecessarily expensive to operate. Previous efforts to eliminate these problems have been unsuccessful.

SUMMARY OF THE INVENTION

In accordance with the present invention, a vacuum frame apparatus is provided for supporting superimposed sheet material which includes an original and a copy sheet in close contact. The apparatus includes a glass plate customarily located above the sheet material. Directions such as "above," "below," "front" and "rear" herein are for relative orientation only and are not recited by way of limitation. On the opposite side of the sheet material from the glass plate (normally below the glass plate) is a sealing membrane which supports the sheets. The glass plate is usually rectangular and includes front, rear and side edges. A vacuum exhaust port is provided adjacent the rear edge of the glass plate. Means if provided for sealing the membrane against the glass plate to thereby form a vacuum chamber between the membrane and the plate to hold a superimposed sheet material. A backing means is operatively associated with the membrane to preferentially facilitate contact of a portion of the sealing membrane adjacent the front edge of the plate opposite the location of the vacuum exhaust port whereby evacuation of the chamber will produce progressive air removal proceeding in a direction toward the vacuum port so that the membrane will progressively contact the glass along an increasing area having as one edge a transverse line of contact which moves from the front edge to the rear edge as air is removed from the chamber through the vacuum port.

The invention will be better understood by reference to the following description and accompanying drawings which illustrate a preferred form of the invention by way of example, this being indicative however of only one of the various ways in which the invention can be practiced within the scope of the appended claims.

THE FIGURES

DESCRIPTION OF THE PREFERRED EMBODIMENT

Figure 2:
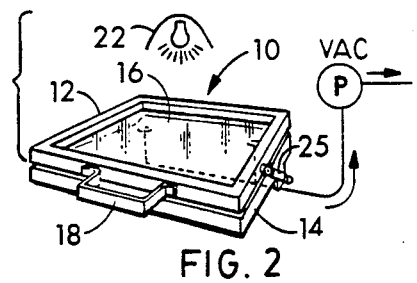
FIG. 2 is similar to FIG. 1 with the top frame in its closed position ready for exposure to light.
Figure 1:
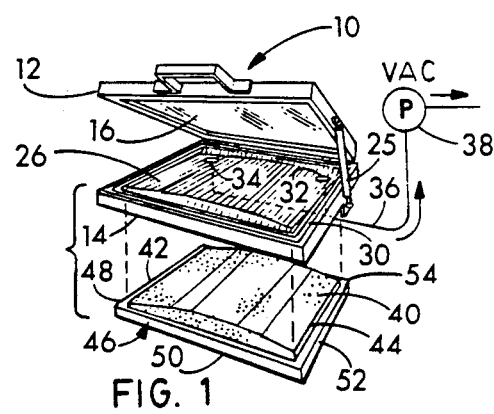
FIG. 1 is a perspective view of the invention with the top frame in its elevated position ready to receive an original and copy sheet.
Figure 6:
FIG. 6 is a view similar to FIG. 5 after evacuation is complete.
Figure 7:
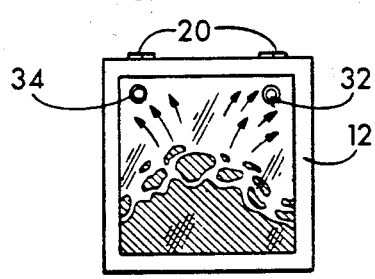
FIG. 7 is a plan view during an early stage of evacuation.
Figure 10:
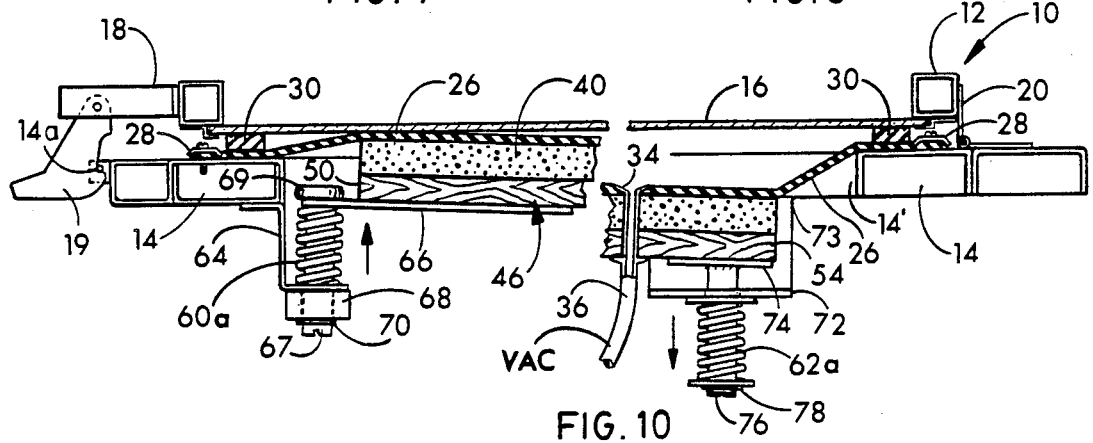

Referring now to the figures and particularly FIGS. 1-6, which illustrate a vacuum frame apparatus indicated generally by the numeral 10 for exposing copy sheets to light with a provision for progressive directional evacuation of air to maintain the sheets in close contact. The apparatus includes upper and lower open generally rectangular superimposed frame members 12 and 14, the upper one of which supports a plate of glass 16. At the front edge of the upper frame member 12 is a handle 18. The rear edge of the frame 12 and the corresponding edge of the glass plate 16 is connected to the lower frame member 14 by means of hinges 20 (FIGS. 7 and 10). When the upper frame member is elevated as shown in FIG. 1 for the insertion of superimposed sheets 24 (FIG. 3), it is held in the open position by means of one or more gas spring supports 25 (FIG. 2). The upper frame member 12 is held during operation in the down position during exposure of the sheets to light from a suitable source such as the lamp 22 by means of a suitable latch 19 (FIG. 10). Latch 19 when locked is engaged over pin 14a which itself is supported on the frame 14. Supported at its edges upon the upper surface of the lower frame member 14 around the entire periphery thereof by means of retaining clips 28 is a flexible sealing sheet 26. Sheet 26 thus extends across and entirely covers the open center 14' of the lower frame member 14. The flexible sheet material may have various compositions but one suitable sheet material is a sheet of ¼" closed cell neoprene foam to which is bonded synthetic cloth such as nylon on at least one surface. A suitable sheet material of this kind can be obtained from Rubatex, Inc. of Bedford, Va. 24523.

A rubber strip 30 encircles the entire edge of the sheet 26 just inside the retaining clips 28 to form a seal between the plate 16 and the sheet 26. The strip 30 can be secured to the sheet 26 by means of an adhesive bonding it to the upper surface thereof.

Positioned beneath the flexible rubber sheet 26 and preferably bonded to it is a foam rubber or plastic sheet 40 that is preferably relatively thick at its center but tapers downwardly toward the side edges 42 and 44. The relatively thick center section between the intersection lines L may be for example about an inch thick. Side edges 42 and 44 may be about ⅝" thick. This will apply greater pressure at the center of the vacuum frame than at the edges. The variation in pressure on different parts of the copy sheet produced by the differences in thickness of the sheet 40 is also very beneficial in facilitating the removal of the nitrogen gas produced when a diazo dye is exposed to ultraviolet light. If allowed to collect in pockets, this gas can adversely affect the resulting copy. However, the greater pressure at the center facilitates transfer of the gas laterally and this cooperates with a greater pressure along the front edge of frames to prevent gas accumulation.

The foam sheet 40 is supported upon a backing plate 46 having opposed side edges 48 and 52 connected together by front and rear edges 50 and 54. The backing plate 46 is supported along its front edge 50 by means of a pair of compression springs 60a and 60b each mounted between a bracket 64 and a support plate 66 connected to the backing plate 46. The compression springs 60a and 60b each fit loosely over a mounting pin 67 the upper end of which is connected to the mounting plate 66 upon a spherical ball bushing 69 so that its lower end will be free to articulate. The lower ends of the mounting pins 67 pass through openings at the lower end of the brackets 64. Over the end of each is mounted a spacer 68 that is secured in place by means of any suitable retaining means such as a screw and washer assembly 70 so that the comression of the springs 60a and 60b yieldably bias the forward edge of the mounting plate and corresponding overlying portion of the sealing sheet 26 upwardly to touch or almost touch the glass plate 16. In this way one edge of the sealing sheet 26 acts somewhat as a hinge held in contact or closely adjacent to the corresponding edge of the glass plate, viz. the left end as seen in FIGS. 3–6 and 10.

Figure 3:
FIG. 3 is a semidiagrammatic vertical sectional view of the apparatus with the top frame in the raised position ready to receive the sheet material that is to be exposed.
Figure 4:
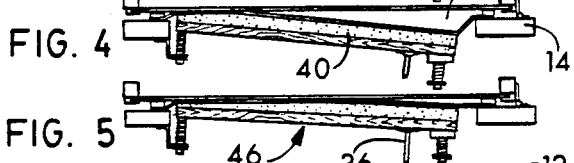
FIG. 4 is a view similar to FIG. 3 with the top frame lowered at the beginning of the evacuation process.
Figure 5:
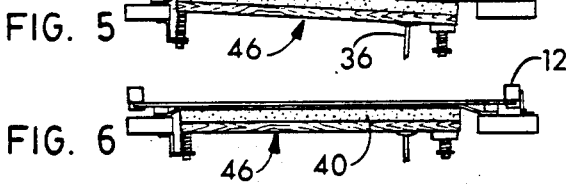
FIG. 5 is similar to FIG. 4 at a succeeding stage of evacuation.
Figure 9:
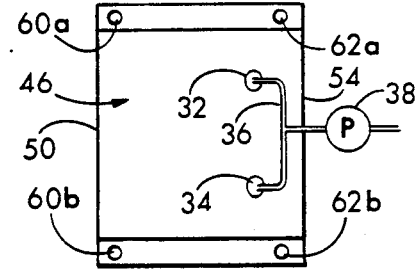
FIG. 9 is a bottom view of the apparatus and FIG. 10 is a vertical sectional view of the apparatus on an enlarged scale partly broken away.

The right (rear) edge of the support plate 46 and corresponding portion of the sealing sheet 26 is initially supported in spaced relationship from the glass plate and frame by the provision of a special mounting means including bracket 72 connected to the lower frame member 14. Corresponding portions of the plate 46 are provided with mounting plates 74. Support pins 76 are supported at their upper ends from plates 74 and extend downwardly through openings in brackets 72. If desired, optional helical compression springs 62a and 62b can be mounted loosely over the pins 76 below bracket 72 and if used each is held in place by means of a screw and washer assembly 78. When under compression, they force the pins 76 and the corresponding edge of plate 46 at the right in FIGS. 3–6 and 10 away from plate 16 prior to evacuation. Thus, whether the springs 62a and 62b are present or not, a wedge shaped chamber 27 is formed as can be clearly seen between the glass plate 16 and the sheet 26. The right edge of the sealing sheet hangs downwardly and its left edge is in close proximity, in this case in contact with the glass plate 16. Air is removed from the wedge shaped chamber 17 into which the sheets 24 are placed through exhaust ports 32 and 34 that are connected through an exhaust pipe 36 to a vacuum pump 38 (FIGS. 1 and 9). In operation with the upper frame raised as shown in FIG. 1, the original and copy sheets 24 are inserted between the flexible sealing sheet 26 and the glass plate 16 as shown in FIG. 3. The upper frame 12 is then lowered to the position of FIGS. 2, 4–6 and 10 and is retained in place by means of the latch 19.

Figure 8:
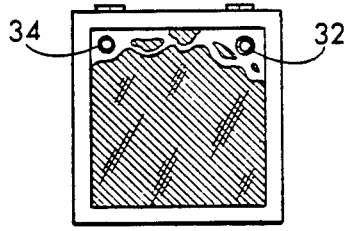
FIG. 8 is a plan view similar to FIG. 7 during a succeeding state of evacuation.

When this has been done, the pump 38 is started causing air to be evacuated from the wedge shaped chamber 27. As this occurs, air will be progressively and directionally evacuated as shown sequentially in FIGS. 2–6 as well as from the top in FIGS. 7 and 8. Contact between the sealing sheet 26 and the plate 16 initially occurs at the right and moves quickly toward the left in FIGS. 3–6 (from the bottom to the top in FIGS. 7 and 8). In this way, the air is progressively, directionally evacuated as the wedge shaped chamber 27 diminishes in size by an action which can be thought of as similar to that of a squeegee traveling from one edge of the plate 16 to the other. The backing 46 is thus operatively associated with the sealing sheet to preferentially urge it into contact with the forward edge of the glass plate thereby facilitating contact between them in one area prior to evacuation of the chamber whereby evacuation of the wedge shaped chamber 27 will produce a progressive evacuation away from an edge first and toward an opposite edge so that the membrane progressively and directionally contacts the glass over an area expanding along a transverse moving line of contact advancing toward one edge of the chamber.

The squeegee-like action on the wedge shaped vacuum chamber 27 as it diminishes in size was found to be surprisingly effective in reducing the draw down time of the vacuum frame without the formation of air pockets from a period of up to 1.5 minutes in an ordinary vacuum frame not using the invention to about 3–6 seconds. Moreover, the invention promotes better contact between the sheets 24 since no trapped air pockets form. Moreover, the squeegee or wiping motion from the front to the back of the vacuum frame maintains perfect registration between the sheets. When upper frame 12 is moved to the closed position, the wedge shaped vacuum chamber 27 which is initially formed gradually diminishes in size and finally disappears as shown in FIG. 6 after an elapsed time of about 5 seconds at which time the sheets 24 are maintained in close registration without air pockets either between them or between the sheets and the glass. In this way, when the lamp 22 is operated, exposures of excellent quality are reliably obtained. It can be seen that the principle of operation allows the backing 46 and correspondingly the sealing sheet 26 to, in effect, pivot upwardly about the left end thereof as seen in FIGS. 1–6 and 10. The invention can be thought of as providing a single pivot point for the sealing sheet 26 and backing 46 so that at least one air port adjacent an edge opposite the pivot point communicates with the wedge shaped chamber between the port and the pivot.

During the evacuation process, the foam pressure pad 40 cooperates with the angular mounting of the backing 46 to assist in the directional removal of air through the air ports 32, 34 by applying somewhat more pressure at the center than at the edges. In this way, the prevention of trapped air pockets is even more reliably assured.

The invention has several advantages over the prior art. One advantage of the invention is particularly evident when a registration device is used as may be done, for example, for aligning a separation negative with a printing plate. In such a case, one or more registration pins or a pin bar (not shown) aligns the negative and a printing plate placed between the negative and blanket 26. The registration pin or bar is placed at the front of the frame. The wiping action of the invention toward the rear and toward the sides as shown in FIG. 7 automatically tends to straighten the superimposed original and copy sheet (the printing plate) by drawing them away from the registration pins thereby maximizing the effectiveness of the pins and maintaining good registration throughout all portions of the copy sheet. In this way, the microscopic dots of color that make up halftone photographs can be reliably maintained in their proper locations without wiping the sheets by hand prior to exposure as used to be done. The cushion sheet 40 also helps by conforming to the contour of the registration pins thereby accommodating them regardless of their size or location.

Many variations of the present invention within the scope of the appended claims will be apparent to those skilled in the art once the principles described above are understood.

What is claimed is:

1. A vacuum frame apparatus with a provision for progressive directional air evacuation of a chamber therein supporting a superimposed copy sheet and an original sheet in close contact comprising, a glass plate having front, rear and side edges, a flexible sealing membrane below the plate supporting the sheet material and sealed at its edges to the glass plate to provide a vacuum chamber therebetween in which the superimposed sheets are located, said chamber having a vacuum exhaust port adjacent the rear edge of the glass plate, a backing means operatively associated with the membrane to preferentially maintain the membrane in closer proximity to the front edge of the glass plate than the rear edge for facilitating contact between the membrane and the plate along the front edge thereof such that the chamber is wedge shaped whereby evacuation of the wedge shaped chamber produces progressive evacuation of air in a direction toward the rear edge of the glass plate so that the membrane progressively contacts the glass over an expanding area having as one edge a moving line of contact advancing toward the rear edge of the glass plate as air is removed from the chamber.

2. The apparatus of claim 1 wherein the backing means includes a backing plate secured to the membrane with resilient means yieldably maintaining one edge thereof further than the other edge from the glass plate.

3. The apparatus of claim 2 wherein said resilient means comprises a pair of helical compression springs yieldably biasing one edge of the backing plate in a direction away from the glass plate.

4. The apparatus of claim 2 wherein a resilient foam pad is mounted in the apparatus between the sealing membrane and the backing plate.

5. The apparatus of claim 1 wherein a resilient means yieldably biases one edge of the backing means in the direction of the glass plate and a second resilient means yieldably biases the opposite edge of the sealing membrane away from the glass plate.

6. The apparatus of claim 1 wherein the backing comprises a backing plate below the sealing membrane and a resilient pressure pad sandwiched between the sealing membrane and the backing plate.

7. The apparatus of claim 6 wherein the resilient pressure pad comprises a foam pad having a pair of side edges, said pad being relatively thick at the center and tapering downwardly toward the side edges thereof to produce greater pressure at the center of the sealing membrane than along the side edges of the pad.

8. A vacuum frame for exposing graphic material to light with provision for progressive directional evacuation of air, said apparatus comprising a vacuum frame having an upper and lower separable frame members, a sealing sheet connected to the lower frame member, means for sealing at least the edges of the sheet to a glass plate on the upper frame, means for holding one edge of the sealing membrane closer to the glass plate than the opposite edge to produce a wedge shaped vacuum chamber for supporting the graphic material, said chamber having at least one air exhaust port adjacent the edge of the apparatus closest to the edge of the sealing membrane that is supported further away from the glass plate whereby when air is removed from the wedge shaped chamber through the exhaust port, the chamber will be progressively evacuated as the membrane is brought into contact with the plate over an ever-increasing area bounded on one side by a transversely oriented and moving line of contact proceeding toward one edge of the glass plate to thereby facilitate the rapid removal of air from the chamber without the formation of air pockets between superimposed sheets of graphic material or between said sheets of graphic material and glass plate.

9. The apparatus of claim 8 wherein said air port comprises a pair of ports adjacent a first edge of said membrane and spring means is provided for yieldably biasing an opposite edge of said membrane in the direction of said glass plate.

10. The apparatus of claim 9 wherein a second spring means is operatively connected to the sealing membrane adjacent the air exhaust port to yieldably bias a portion of the sealing membrane adjacent the air exhaust port in a direction away from the glass plate.

11. A vacuum frame apparatus for exposing superimposed sheets of graphic material to light while holding the sheets in close contact with a provision for progressive directional evacuation of the air from a chamber within the apparatus holding the copy sheets, said apparatus comprising a supporting framework, an upper frame adapted to be raised and lowered from the supporting frame, said upper frame including a glass plate, a sealing membrane connected to the lower frame with provision for sealing the periphery of the sealing membrane to the glass plate when the upper frame member is lowered into proximity with the supporting frame and means adapted to facilitate preferential contact between at least one portion of the sealing membrane and the glass prior to evacuation and means for removing air from the chamber between the membrane and the glass plate through and air exhaust opening located remote from said one portion whereby the membrane will progressively contact the glass plate over an area of contact expanding in the direction of the air exhaust opening and away from said first area of preferential contact to thereby facilitate the rapid removal of the air from the chamber without the formation of pockets of trapped air.

12. The vacuum frame of claim 8 wherein an original and copy sheet having registration pins between them is used, the registration pins are placed adjacent said one edge of the sealing membrane and the evacuation of air exerts a wiping action to straighten the sheets by drawing them away from the registration pins as the chamber is progressively evacuated in the direction of the exhaust port.

* * * * *